Figure 1:
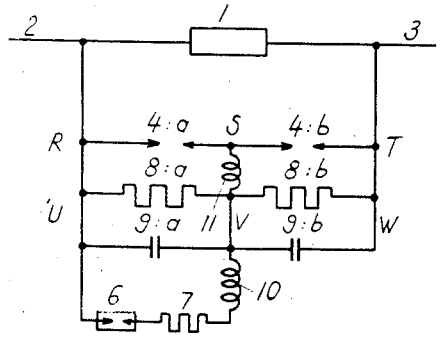

March 17, 1959  M. BÖCKMAN ET AL  2,878,428
OVER-VOLTAGE PROTECTION DEVICE
Filed Aug. 16, 1954

Inventors.
Marius Böckman
and Bengt Grundmark
By James Aiken
Attorney.

United States Patent Office 2,878,428
Patented Mar. 17, 1959

2,878,428

OVER-VOLTAGE PROTECTION DEVICE

Marius Böckman and Bengt Grundmark, Ludvika, Sweden, assignors to Allmänna Svenska Elektriska Aktiebolaget, Vasteras, Sweden, a Swedish corporation Application August 16, 1954, Serial No. 449,999

Claims priority, application Sweden August 31, 1953

9 Claims. (Cl. 317—112)

This invention relates to a particular kind of protective devices, which are used to protect an electrical equipment connected in series with an electric power circuit against high fault currents. Such over-currents will cause an abnormally high voltage drop across the equipment to be protected, and, therefore, they have to be diverted through a by-pass device. In some cases, a by-pass switch with automatic closing can be used, but in many cases it is necessary to use a spark gap, which is adjusted to spark over at a prescribed voltage. This spark-over may be arranged to be dependent on the over-current wave shape or frequency, and it may further be delayed a suitable period of time.

The present invention deals with such spark gaps with high spark-over voltage primarily intended for use with series capacitors in power transmission systems, but the principles laid down may, of course, as well be used in applications of other kinds. A gap for this purpose must be capable of handling the full short-circuit power current of the system after spark-over, and this makes it necessary to use a very robust design. On the other hand, it is necessary to arrange for very high precision in the spark-over voltage, as any dispersion in this figure must be met by an additional increase in insulation strength of the apparatus to be protected by the gap. A dispersion margin of plus-minus 5 percent is wanted, and this is not feasible with a conventional gap, subjected to variations in density of the surrounding air.

The sturdy by-pass gap, which is capable of carrying heavy short-circuit current, can be relieved of the duty to present a well-defined spark-over voltage. This gap structure, hereafter to be called the main diverter, is then subdivided in a plurality of series-connected individual gaps, which have to carry proportionate parts of the voltage across the whole main diverter. These proportionate parts of the voltage are determined by a voltage divider chain, which is conveniently made up by resistance and capacitance elements in parallel but may consist of other suitable impedance elements. Each portion of the main diverter has a spark-over value that is higher than its proportionate part of the predetermined spark-over voltage of the entire protective circuit. Connected to the voltage divider is a precision spark-over gap, which has a very small dispersion in spark-over voltage. This precision spark-over gap sparks over, when the voltage across the whole of the main diverter reaches the predetermined protection voltage level of the equipment. The precision gap spark-over strongly upsets the voltage division between the main diverter elements, which has before been governed by the voltage divider chain, and one of the gaps in the main diverter will be distinctly overstressed and spark over. Thereby its stress will be shifted over to the rest of the main diverter, which will be exposed to more than its original fraction of the total voltage and, therefore, spark over, so that the whole of the main diverter becomes conducting and permits the fault current to pass.

The present invention lies in improved arrangement of the precision spark-over gap circuit and the voltage divider in order to give a more reliable operation of the circuit under adverse conditions.

One element of the invention is the insertion of a valve type resistance in series with the precision spark-over gap. This kind of impedance permits a strong oscillation transient to pass with rather little resistance damping, while any power frequency current after the protective circuit has become conducting is effectively prevented from passing the precision spark-over gap.

Another improvement of the art is to provide impedance connections between the voltage divider chain and the main diverter chain instead of direct jumper connections. This means that the changes in voltage distribution of the voltage divider is imposed upon the main diverter chain not instantly but with a predetermined time constant or in an oscillatory manner giving overshoots on the voltage changes, which appear across the main diverter elements and thus improving a distinct succession of the bigger action.

A further object of the invention is to obtain a safer breakdown in the individual spark gaps of the main diverter after the action of the precision spark-over gap by governing the voltage divider chain potentials by means of capacitive means.

The invention will be more clearly understood in the accompanying drawing and the detailed description below.

Figure 2:
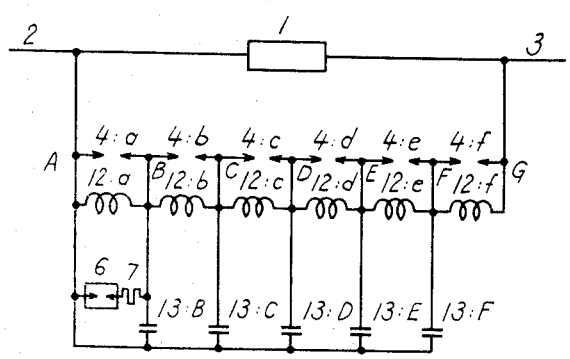

Fig. 1 shows a main diverter consisting of two individual spark gaps, Fig. 2 a main diverter formed by a greater number of such gaps.

Fig. 1 shows an elementary diagram of a circuit with an electrical equipment 1 connected in series with a power line circuit from 2 to 3. This equipment 1 has to be protected from over-currents in the circuit 2—3, and, therefore, a sturdy main diverter having terminals R, T is provided, which is subdivided into individual spark gaps. In Fig. 1 two such spark gaps are shown, denoted 4:a and 4:b. These individual spark gaps are given proportionate parts of the voltage across the protected equipment 1 by means of the voltage divider, which consists of capacitors 9:a, 9:b, and resistors 8:a, 8:b, in parallel.

The combination of resistors and capacitors makes it possible to maintain a correct distribution of voltage under direct current conditions as well as under power frequency or rapid transients. Suppose that no resistors were present, and the circuit 2–3 would be switched off, while there are charges present on the capacitors 9:a and 9:b. Under bad weather conditions these charges might leak out over external creepage paths on the capacitors, which might present different resistances on the two capacitors, and at a following reclosure of the circuit 2–3 there would, therefore, be an asymmetry in the voltage division between the divider links. This would cause a faulty operation of the protective gap. The precaution advised against this case is the addition of resistors 8:a and 8:b, which are given lower ohmic values than the expected resistance along any creepage path, which is present in parallel with the resistors, thus assuring that the charges on both capacitors leak out with substantially the same time constant, so that the initial charges at a following reclosure of the main circuit are proportional to the correct voltage distribution.

The precision spark-over gap determining the effective spark-over voltage of the main diverter is indicated by 6. It is known per se from the previous art to introduce in series with this precision spark-over gap an inductance 10, which, after the precision spark-over gap has sparked over, causes an oscillation with capacitors 9:a and 9:b. If the potentials are measured with respect to point U and point W is taken as 100%, point V may originally have the potential 50%. During the oscillation, point V swings over through zero to a negative value equal to or less than 50%. This value is added to the value 100%, being across the voltage divider part 8:*b*, 9:*b*. In this moment the potential difference between points V and W thus approaches 150%, which is three times as much as the proportionate part of the total voltage that fell upon this part of the circuit, before the precision gap spark-over. Each of the main diverter gaps is adjusted to a spark-over voltage in the region 60–100%, and, therefore, gap 4:*b* sparks over during this oscillation.

After this partial spark-over of the main diverter, the distribution of voltages is again changed, so that the entire voltage 100% is shifted over to the remaining part 4:*a* of the main diverter, which then in turn sparks over.

An improvement in comparison with the previous art is to connect in series with the precision spark-over gap a voltage dependent valve type resistor 7 of essentially the same characteristics as those used in conventional valve type lightning arresters. A resistor of this kind may be dimensioned so as to give a rather unimportant damping of the oscillation immediately after precision gap spark-over but still very effectively quench the part of the main discharge from circuit 2–3 that might without this voltage dependent resistor 7 flow through the precision spark-over gap. Thus the precision spark-over gap can be designed without any large current-carrying capacity, and furthermore its de-ionization takes place more rapidly, so that it recovers to full spark-over voltage during not more than a half cycle after the first spark-over. This is essential in such applications, where the whole gap assembly is called upon to possess good re-sealing properties. In such applications the main diverter must quench the heavy current at each current zero and be re-triggered by the precision spark-over gap during the next half-cycle again and again, until the power frequency over-voltage across the whole assembly, because of the short-circuit current in circuit 2–3, does not prevail any more.

A further improvement in comparison with the previous art lies in the introduction of an inductance 11 between the voltage divider and the main diverter element junction S. This inductance does not play any part in the circuit operation, until the first partial spark-over of the main diverter has taken place, but thereafter it makes the redistribution of voltage between the capacitors 9:*a* and 9:*b* oscillatory, so that the voltage at point S reaches a momentary value even higher than 100%. This gives a better distinctness in the spark-over of the main diverter portion 4:*a*.

In Fig. 2, an entirely new way of arranging a voltage divider and a precision spark-over gap together with a multiple main diverter is shown. In this figure the voltage divider consists of a series of inductances 12:*a*, 12:*b*, 12:*c*, 12:*d*, 12:*e* and 12:*f*. From different joints B through F between the voltage divider and the main diverter chain 4:*a*, 4:*b*, 4:*c*, 4:*d*, 4:*e* and 4:*f* there are capacitors 13:B, 13:C, 13:D, 13:E and 13:F connected to one end of the main diverter, point A. The subdivisions need not be equal, but for the sake of simplicity this is assumed in the following description of the circuit action. A precision spark-over gap 6 with a preferably non-linear valve type resistance 7 in series is connected from point A to a junction between the voltage divider and the main diverter. This junction is B in Fig. 2, being the junction adjacent to point A, but also some other junction farther from A (the other junction points being C, D, E, F, G) can be used without any change in principle of the circuit operation.

When a spark-over takes place in the precision spark-over gap, the voltage at point B is changed towards that of point A. It is possible to give point B an oscillatory over-shoot in the same way as in Fig. 1 by inserting in the precision spark-over gap circuit an inductance equivalent to 10 of Fig. 1, though this is not specially shown in Fig. 2. If all potentials are referred to point A, and each individual spark gap is supposed to carry 17% (roughly one sixth) of the entire voltage, the spark-over voltage of each individual spark gap shall be in the region 20–30%. The voltage at point B changes from 17 to zero—or below—and gap 4:*b* sparks over, as point C is still governed by capacitor 13:C having a potential 33%. The next step is that capacitor 13:C discharges through gap 4:*b* and the precision spark-over gap, so that point C potential changes strongly towards zero—or even swings over negative. Point D is still governed by capacitor 13:D holding 50% voltage, and, therefore, gap 4:C has to spark over. Thus the triggering action proceeds through the entire main diverter. The main diverter portion 4:*a* being in parallel with the precision spark-over gap circuit may have sparked over during this procedure already, but otherwise it is triggered, when all the rest of the main diverters have opened, so that the entire voltage is applied across the precision spark-over gap series impedance 7.

As pointed out above, the precision spark-over gap should break down for a precise, desired voltage value independent of outer influences such as air pressure and ambient temperature. Therefore, a hermetically sealed spark-over gap is conveniently used for the purpose, filled for instance with dry nitrogen gas of atmospheric pressure. The precision spark-over gap may be composed of a number of series-connected gaps for quickly regaining its dielectric strength after spark-over.

We claim as our invention:

1. For the protection of an electrical equipment, an over-voltage protection device, comprising a plurality of individual spark gaps in series connection, forming a main diverter across said equipment, a plurality of impedance elements in series connection, forming a voltage divider chain conductive for direct current across said main diverter, a reactor inserted between mutual junction terminals of said spark gaps and mutual junction terminals of said impedance elements, a precision spark-over gap in series connection with an impedance means connected in parallel with at least one of said impedance elements, the impedance means substantially consisting of a valve type resistor.

2. For the protection of an electrical equipment, an over-voltage protection device, comprising a plurality of individual spark gaps in series connection, forming a main diverter across said equipment, a plurality of impedance elements in series connection, forming a voltage divider chain conductive for direct current across said main diverter, inductive means inserted between mutual junction terminals of said spark gaps and mutual junction terminals of said impedance elements, a precision spark-over gap in series connection with a valve type resistor connected in parallel with at least one of said impedance elements.

3. For the protection of an electrical equipment, an over-voltage protection device, comprising a plurality of individual spark gaps in series connection, forming a main diverter across said equipment, a plurality of impedance elements in series connection, forming a voltage divider chain conductive for direct current across said main diverter, a precision spark-over gap in series connection with impedance means connected in parallel with at least one of said spark gaps, the impedance means substantially consisting of a valve type resistor.

4. For the protection of an electrical equipment, an over-voltage protection device, comprising a plurality of individual spark gaps in series connection, forming a main diverter across said equipment, a plurality of impedance elements in series connection, forming a voltage divider chain conductive for direct current across said main diverter, inductive means inserted between mutual junction terminals of said spark gaps and mutual junction terminals of said impedance elements, a precision spark-over gap in series connection with impedance means connected in parallel with at least one of said impedance elements, the impedance means consisting of a valve type resistor and a reactor in series connection.

5. For the protection of an electrical equipment, an over-voltage protection device, comprising a plurality of individual spark gaps in series connection, forming a main diverter across said equipment, a plurality of impedance elements in series connection, forming a voltage divider chain conductive for direct current across said main diverter, a precision spark-over gap in series connection with impedance means connected in parallel with at least one of said impedance elements, each impedance element being composed of resistive and capacitive components connected in parallel with each other.

6. For the protection of an electrical equipment, an over-voltage protection device, comprising a plurality of individual spark gaps in series connection, forming a main diverter across said equipment, a plurality of impedance elements in series connection, forming a voltage divider chain conductive for direct current across said main diverter, a precision spark-over gap in series connection with impedance means connected in parallel with at least one of said impedance elements and capacitive means, inserted between a terminal of one impedance element and other impedance element terminals.

7. For the protection of an electrical equipment, an over-voltage protection device, comprising a plurality of series-connected individual spark gaps, forming a main diverter across said equipment, a plurality of impedance elements in series connection, forming a voltage divider chain conductive for direct current across said main diverter, a precision spark-over gap in series connection with impedance means connected in parallel with at least one of said impedance elements, and capacitive means inserted between mutual junction terminals of said impedance elements and the terminal of the impedance element connected to the end terminal of the main diverter.

8. For the protection of an electrical equipment, an over-voltage protection device, comprising a plurality of individual spark gaps in series connection, forming a main diverter across said equipment, a plurality of impedance elements in series connection, forming a voltage divider chain conductive for direct current across said main diverter, a precision spark-over gap in series connection with impedance means connected in parallel with at least one of said impedance elements and capacitive means inserted between the mutual junction terminals of said impedance elements and a terminal of the precision spark-over gap connected to one main diverter end terminal.

9. For the protection of an electrical equipment, an over-voltage protection device, comprising a plurality of individual spark gaps in series connection, forming a main diverter across said equipment, a plurality of inductive elements in series connection, forming a voltage divider chain conductive for direct current across said main diverter, a precision spark-over gap in series connection with impedance means connected in parallel with at least one of said inductive elements and capacitive means inserted between the mutual junction terminals of said inductive elements and the main diverter end terminal connected to one terminal of the precision spark-over gap.

References Cited in the file of this patent

UNITED STATES PATENTS

| Number | Name | Date |
|---|---|---|
| 2,363,898 | Partington | Nov. 28, 1944 |
| 2,399,367 | Marbury | Apr. 30, 1946 |
| 2,401,009 | Marbury | May 28, 1946 |
| 2,539,749 | Nelson | Jan. 30, 1951 |

FOREIGN PATENTS

| Number | Country | Date |
|---|---|---|
| 149,619 | Great Britain | Nov. 18, 1920 |